United States Patent
Xiao et al.

(10) Patent No.: US 10,630,124 B2
(45) Date of Patent: Apr. 21, 2020

(54) ELECTRIC MOTOR AND TANGENTIAL TYPE PERMANENT MAGNET ROTOR THEREOF

(71) Applicant: Gree Electric Appliances, Inc. of ZHUHAI, Zhuhai, Guangdong (CN)

(72) Inventors: Yong Xiao, Guangdong (CN); Yusheng Hu, Guangdong (CN); Bin Chen, Guangdong (CN)

(73) Assignee: GREE ELECTRIC APPLIANCES, INC. OF ZHUHAI, Zhuhai, Guangdong (CN)

(*) Notice: Subject to any disclaimer, the term of this patent is extended or adjusted under 35 U.S.C. 154(b) by 0 days.

(21) Appl. No.: 15/762,714

(22) PCT Filed: Jun. 2, 2016

(86) PCT No.: PCT/CN2016/084524
§ 371 (c)(1),
(2) Date: Mar. 23, 2018

(87) PCT Pub. No.: WO2017/049954
PCT Pub. Date: Mar. 30, 2017

(65) Prior Publication Data
US 2018/0287442 A1 Oct. 4, 2018

(30) Foreign Application Priority Data
Sep. 24, 2015 (CN) .......................... 2015 1 0622376

(51) Int. Cl.
*H02K 1/27* (2006.01)
*H01F 13/00* (2006.01)

(52) U.S. Cl.
CPC ......... *H02K 1/2773* (2013.01); *H01F 13/003* (2013.01); *H02K 1/27* (2013.01); *H02K 2213/03* (2013.01)

(58) Field of Classification Search
CPC ........ H02K 1/00; H02K 1/278; H02K 1/2706; H02K 1/2773; H02K 1/272; H02K 1/274;
(Continued)

(56) References Cited

U.S. PATENT DOCUMENTS 8,432,080 B2 * 4/2013 Murakami ........... H02K 1/2766
310/156.08
2012/0013206 A1 1/2012 Meyer
(Continued)

FOREIGN PATENT DOCUMENTS

CN 101232205 A 7/2008
CN 201146439 Y 11/2008
(Continued)

OTHER PUBLICATIONS

WIPO, International Search Report dated Sep. 7, 2016.
European Patent Office, European Search Report dated Mar. 20, 2019.

*Primary Examiner* — Alfonso Perez Borroto
*Assistant Examiner* — Ahmed Elnakib
(74) *Attorney, Agent, or Firm* — Li & Cai Intellectual Property (USA) Office

(57) ABSTRACT

The invention discloses an electric motor and a tangential type permanent magnet rotor. The tangential type permanent magnet rotor includes a rotor iron core (2) and permanent magnets (1) provided on the rotor iron core (2); a width of one side, close to the outer edge of the rotor iron core (2), of each of the permanent magnets (1) is H2; and a width of one side, close to the center of the rotor iron core (2), of each of the permanent magnets (1) is H1, wherein H2>H1. The tangential type permanent magnet rotor enables the width H2 of a permanent magnet part close to the outer edge of the rotor iron core to be larger, and enables the width H1 of a permanent magnet part close to the center of the rotor iron core to be smaller.

11 Claims, 6 Drawing Sheets

(58) Field of Classification Search
CPC .. H02K 1/2746; H02K 1/2753; H02K 1/2766; H02K 1/27; H02K 1/276
USPC ............ 310/156.25, 156.33, 156.38, 156.43, 310/156.45, 156.46, 156.48, 156.49, 310/156.54, 156.83
See application file for complete search history.

(56) References Cited

U.S. PATENT DOCUMENTS

| | | | |
|---|---|---|---|
| 2013/0119790 A1 | | 5/2013 | Gan et al. |
| 2013/0278105 A1* | | 10/2013 | Han .................... H02K 1/276 310/156.38 |
| 2014/0361656 A1 | | 12/2014 | Legranger |

FOREIGN PATENT DOCUMENTS

| | | | |
|---|---|---|---|
| CN | 201270437 Y | | 7/2009 |
| CN | 102306966 | * | 1/2012 |
| CN | 102306966 A | | 1/2012 |
| CN | 103166345 A | | 6/2013 |
| CN | 204068474 U | | 12/2014 |
| CN | 104600938 A | | 5/2015 |
| CN | 204376558 U | | 6/2015 |
| CN | 20466914 U | | 9/2015 |
| CN | 204669114 | * | 9/2015 |
| CN | 204669114 U | | 9/2015 |
| CN | 205017131 U | | 3/2016 |
| EP | 2658091 A2 | | 10/2013 |
| JP | 2009-268204 A | | 11/2009 |
| KR | 1020150007371 A | | 1/2015 |

* cited by examiner

ELECTRIC MOTOR AND TANGENTIAL TYPE PERMANENT MAGNET ROTOR THEREOF

This application claims a priority to the Chinese patent application No. 201510622376.0, filed with the Chinese Patent Office on Sep. 24, 2015 and entitled "Electric motor and tangential type permanent magnet rotor thereof", the entire content of which is incorporated herein by reference.

TECHNICAL FIELD

The present invention relates to a technical field of electric motor devices, and more particularly, to an electric motor and a tangential type permanent magnet rotor thereof.

BACKGROUND

An electric motor of a permanent magnet tangential-magnetization structure can generate a higher air gap flux density than a permanent magnet radial-magnetization electric motor due to its magnetism gathering effect. As a result, the electric motor has a relatively large torque/current ratio and torque/volume ratio and is increasingly applied to an occasion such as a servo system, electric traction, office automation and a household electrical appliance.

In a tangential permanent magnet electric motor, due to a magnetic circuit structure in which single permanent magnets are in parallel connection, operating points of the permanent magnets are lower than a radial magnetic electric motor. Moreover, most permanent magnets are of a rectangular shape, and widths thereof along a radial direction of a rotor are almost the same. However, the intensities of a demagnetized field on different parts of the permanent magnets are different and this is the case for the operating points on different parts of the same permanent magnet. Hence, the overall demagnetization resistance of the electric motor is reduced. Particularly, the closer the permanent magnets are to an outer side of the rotor, the stronger the intensities of the demagnetized field are borne, such that an efficiency of the electric motor is reduced.

Therefore, how to reduce the local demagnetization of the permanent magnets and ensure the efficiency of the electric motor is a technical problem to be solved by a person skilled in the art at present.

SUMMARY

The present invention is intended to provide a tangential type permanent magnet rotor, so as to reduce a local demagnetization of permanent magnets and ensure an efficiency of an electric motor. The present invention further provides an electric motor having the above tangential type permanent magnet rotor.

To solve the above technical problem, the present invention provides a tangential type permanent magnet rotor, which comprises a rotor iron core and permanent magnets provided on the rotor iron core, a width of one side, close to an outer edge of the rotor iron core, of each of the permanent magnets is H2; and a width of one side, close to a center of the rotor iron core, of each of the permanent magnets is H1, wherein H2>H1.

Preferably, in the above tangential type permanent magnet rotor, $2.2 \geq H2/H1 \geq 1.2$.

Preferably, in the above tangential type permanent magnet rotor, a maximum included angle of a magnetic conductive passage between adjacent two permanent magnets is A2, and a minimum included angle of each of the permanent magnets is A1, $A2 \geq A1$, the A1 is an included angle of connecting lines that are respectively between two ends of a surface at one side, close to the outer edge of the rotor iron core, of each of the permanent magnets and the center of the rotor iron core; the A2 is an included angle of connecting lines that are respectively between two ends of a surface at one side, close to the outer edge of the rotor iron core, of the magnetic conductive passage between the adjacent two of the permanent magnets and the center of the rotor iron core.

Preferably, in the above tangential type permanent magnet rotor, $A2 \leq 1.6 A1$.

Preferably, in the above tangential type permanent magnet rotor, a cross section, perpendicular to an axial line of the tangential type permanent magnet rotor, of each of the permanent magnets is of an isosceles trapezoid; and an upper bottom of the isosceles trapezoid is provided at a side close to the center of the rotor iron core.

Preferably, in the above tangential type permanent magnet rotor, a cross section, perpendicular to an axial line of the tangential type permanent magnet rotor, of each of the permanent magnets is of a non-isosceles trapezoid, an upper bottom of the non-isosceles trapezoid is provided at a side close to the center of the rotor iron core, and a waist of the non-isosceles trapezoid comprises a first waist provided at a front side of a rotation direction of the tangential type permanent magnet rotor and a second waist provided at a rear side of the rotation direction of the tangential type permanent magnet rotor; a length of the first waist is greater than that of the second waist.

Preferably, in the above tangential type permanent magnet rotor, the rotor iron core is provided with an outside magnetism isolating bridge provided at one side, close to the outer edge of the rotor iron core, of each of the permanent magnets, the outside magnetism isolating bridge comprises a first outside magnetism isolating bridge provided at a front side of the rotation direction of the tangential type permanent magnet rotor, and a second outside magnetism isolating bridge provided at a rear side of the rotation direction of the tangential type permanent magnet rotor, a thickness B1 of the first outside magnetism isolating bridge is greater than a thickness B2 of the second outside magnetism isolating bridge; a length D1 of the first outside magnetism isolating bridge is smaller than a length D2 of the second outside magnetism isolating bridge.

Preferably, in the above tangential type permanent magnet rotor, the rotor iron core is further provided with an inside magnetism isolating structure provided between sides, close to the center of the rotor iron core, of the adjacent two of the permanent magnets, a cross section, perpendicular to an axial line of the tangential type permanent magnet rotor, of the inside magnetism isolating structure is of a triangular or trapezoidal structure; a small end of the inside magnetism isolating structure is towards the center of the rotor iron core.

Preferably, in the above tangential type permanent magnet rotor, a first inside magnetism isolating bridge is formed between the inside magnetism isolating structure and each of the permanent magnets provided at a front side of a rotation direction of the tangential type permanent magnet rotor; a second inside magnetism isolating bridge is formed between the inside magnetism isolating structure and each of the permanent magnets provided at a rear side of the rotation direction of the tangential type permanent magnet rotor, a thickness C1 of the first inside magnetism isolating bridge is greater than a thickness C2 of the second inside magnetism isolating bridge.

Preferably, in the above tangential type permanent magnet rotor, a middle line of each of the permanent magnets is provided at a front side of a rotation direction of the tangential type permanent magnet rotor, the tangential type permanent magnet rotor is provided on a diameter line of the corresponding each of permanent magnets, the diameter line is a straight line where a diameter of the rotor iron core perpendicular to a side, close to the center of the rotor iron core, of each of the permanent magnets is located.

The present invention further provides an electric motor, comprising a tangential type permanent magnet rotor; the tangential type permanent magnet rotor is the tangential type permanent magnet rotor described above.

The tangential type permanent magnet rotor provided by the present invention enables the width H2 of a permanent magnet part close to the outer edge of the rotor iron core to be larger, and enables the width H1 of a permanent magnet part close to the center of the rotor iron core to be smaller, so that operating points at two sides (the side close to the center of the rotor iron core and the side close to the outer edge of the rotor iron core) of each of the permanent magnets and operating points of a permanent magnet with equal widths in the related art have relatively high consistency, thus reducing the effect of local demagnetization of the permanent magnets, and ensuring the efficiency of the electric motor.

The present invention further provides the electric motor having the above tangential type permanent magnet rotor. The tangential type permanent magnet rotor has the above technical effects, so the electric motor having the tangential type permanent magnet rotor also should have the same technical effects, which will not be described in detail here.

DETAILED DESCRIPTION OF THE EMBODIMENTS

The core of the present invention is to provide a tangential type permanent magnet rotor so as to reduce a local demagnetization effect of permanent magnets and ensuring an efficiency of an electric motor. The present invention further provides an electric motor having the above tangential type permanent magnet rotor.

To make a person skilled in the art better understand the solutions of the present invention, the present invention will be further described in detail with reference to accompanying drawings and specific implementation manners.

Figure 1:
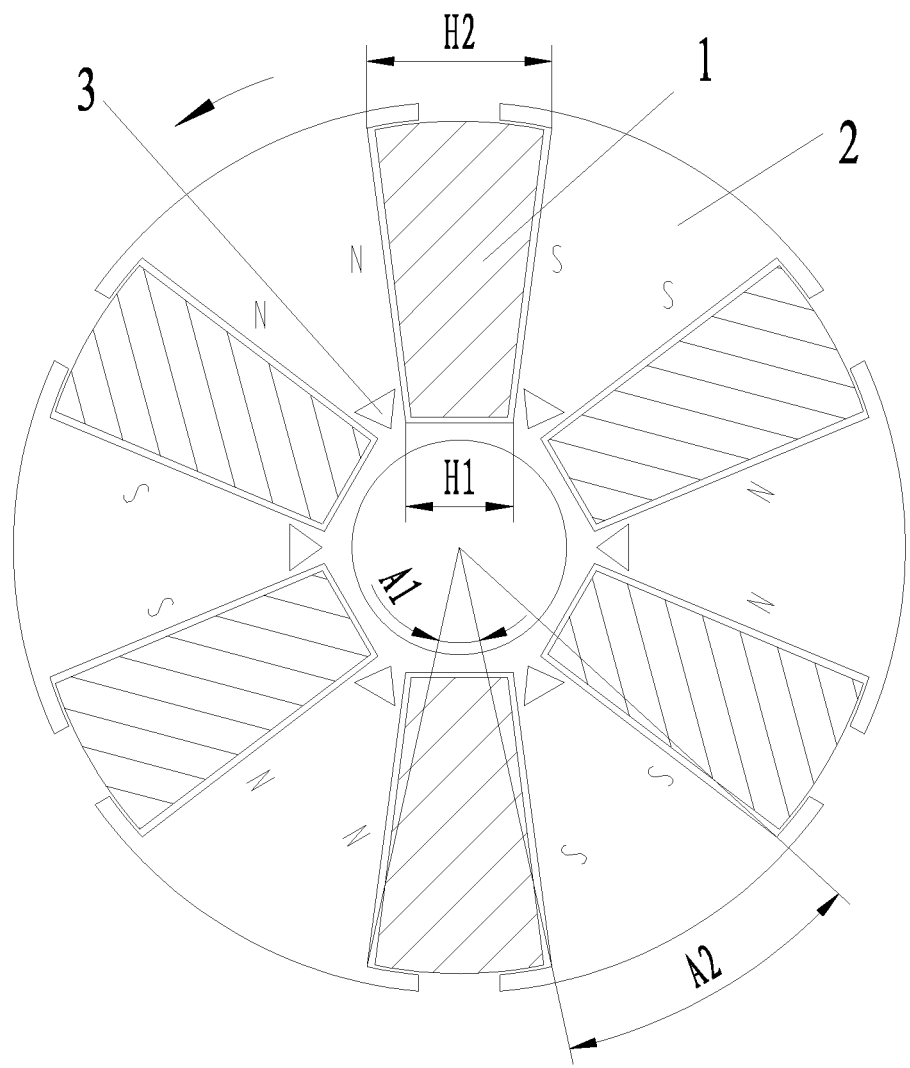
FIG. 1 is a first structural schematic diagram of a tangential type permanent magnet rotor provided by the present invention.
Figure 2:
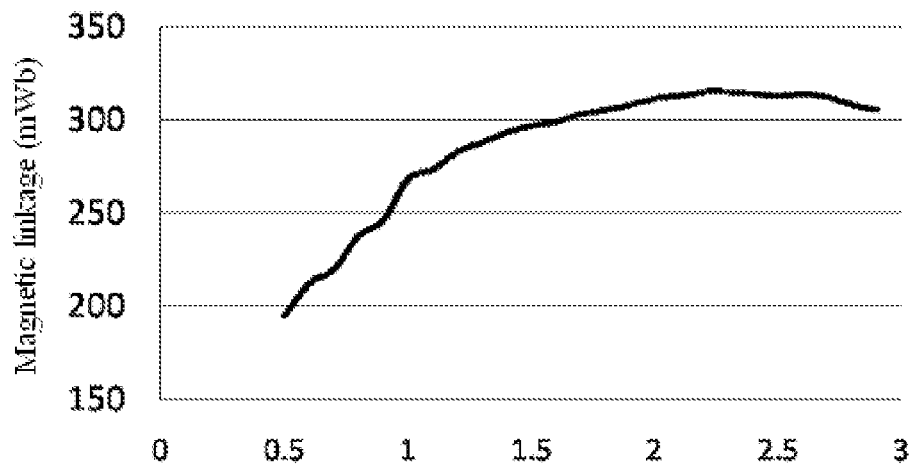
FIG. 2 is a systematic diagram illustrating a relationship between a width ratio of a permanent magnet and a magnetic linkage of a tangential type permanent magnet rotor provided by the present invention.

Please referring to FIG. 1 and FIG. 2, FIG. 1 is a first structural schematic diagram of a tangential type permanent magnet rotor provided by the present invention. FIG. 2 is a systematic diagram illustrating a relationship between a width ratio of a permanent magnet and a magnetic linkage of a tangential type permanent magnet rotor provided by the present invention.

In this specific implementation manner, the tangential type permanent magnet rotor comprises a rotor iron core 2 and permanent magnets 1 provided on the rotor iron core 2, wherein an even number of the permanent magnets 1 are provided and the permanent magnets 1 are evenly provided on the rotor iron core 2; homopolarities of adjacent two permanent magnets 1 are opposite.

In the embodiment, a width of one side, close to an outer edge of the rotor iron core 2, of each of the permanent magnets 1 is H2; and a width of one side, close to a center of the rotor iron core 2, of each of the permanent magnets 1 is H1, wherein H2>H1.

The tangential type permanent magnet rotor provided by the embodiment of the present invention enables the width H2 of a permanent magnet part close to the outer edge of the rotor iron core 2 to be larger, and enables the width H1 of a permanent magnet part close to the center of the rotor iron core 2 to be smaller, so that operating points at two sides (a side close to the center of the rotor iron core 2 and a side close to the outer edge of the rotor iron core 2) of each of the permanent magnets 1 and operating points of a permanent magnet with equal widths in the prior art have relatively high consistency, thus reducing an effect of local demagnetization of the permanent magnets, and ensuring an efficiency of the electric motor.

Further, in the tangential type permanent magnet rotor provided by the embodiment of the present invention, a value range for the width at two sides of each of the permanent magnets 1 is as follows: $2.2 \geq H2/H1 \geq 1.2$.

The present invention will be described below in conjunction with FIG. 2.

It is found in a research that, when the electric motor operates with a load, an operating point, close to an outside of the rotor, of each of the permanent magnets is lower than that of a part close to an inside. The parts that generate a stator flux in the permanent magnets are mainly focused in the outside of the rotor. By setting the widths H2, close to the outside of the rotor, of the permanent magnets to be greater than the widths H1 close to the inside of the rotor, the operating points, close to the outside of the rotor, of the permanent magnets 1 can be effectively improved. Furthermore, as a thickness of the outside is increased, a reversed magnetic field of a stator externally added on the rotor is more applied to positions, close to the inside of the rotor, of the permanent magnets, such that the permanent magnets at positions with relatively high operating points bear a large intensity of the demagnetizing field, and those at positions with relatively low operating points bear a small intensity of the demagnetizing field. Hence, the magnetic field of each of the whole permanent magnets is more evenly, and the air gap magnetic flux density generated by the permanent magnets of the electric motor has a lower harmonic content. However, the higher H2/H1 ratio is not the better. When the H2/H1>2.2, a stator magnetic linkage is basically no longer increased and thus the stator magnetic flux is no longer increased. Therefore, in order to ensure a utilization rate of the permanent magnets 1 and reduce the cost, in each of the permanent magnets 1, 2.2≥H2/H1.

Further, to achieve a better effect, by providing the H2/H1 to be equal to or greater than 1.2, the stator magnetic linkage is increased more obviously, such that the electric motor has a higher efficiency.

Figure 3:
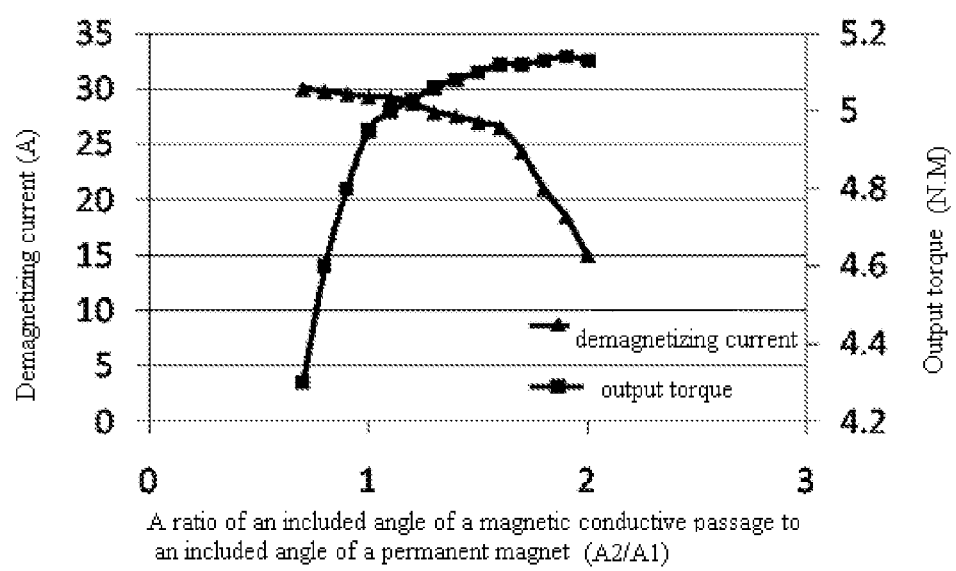
FIG. 3 is a systematic diagram illustrating a relationship among an included angle ratio, a demagnetizing current and an output torque of a tangential type permanent magnet rotor provided by the present invention.

In addition, through finite element simulation, it is found that, a rotor magnetic flux also enters the stator via a silicon steel sheet magnetic conductive passage in the middle of two adjacent permanent magnets. When the electric motor is heavily loaded, it is the most easy to occur magnetic saturation in the silicon steel sheet magnetic conductive passage such that a torque of the electric motor is reduced. The maximum included angle of the magnetic conductive passage between adjacent two permanent magnets 1 is A2, and the minimum included angle for the permanent magnets 1 is A1, A2≥A1. As shown in FIG. 2, the A1 is an included angle of connecting lines that are respectively between two ends of a surface at one side, close to the outer edge of the rotor iron core 2, of each of the permanent magnets 1 and the center of the rotor iron core 2; the A2 is an included angle of connecting lines that are respectively between two ends of a surface at one side, close to the outer edge of the rotor iron core 2, of the magnetic conductive passage between the adjacent two of the permanent magnets 1 and the center of the rotor iron core 2. As shown in FIG. 3, the magnetic conductive passage between the adjacent two permanent magnets 1 are not obviously saturated under the heavy load, such that an output torque of the electric motor is not reduced.

Further, the larger magnetic conductive passages between the permanent magnets are not the better. While the A2 are increased, it is easy to cause that a demagnetization resistance of the electric motor is reduced. As shown in FIG. 3, preferably, the A2 is smaller than or equal to 1.6A1. Hence, in the embodiment, 1≤A2/A1≤0.6.

As shown in FIG. 1, in the embodiment, a cross section, perpendicular to an axial line of the tangential type permanent magnet rotor, of each of the permanent magnets 1 is of an isosceles trapezoid; an upper bottom of the isosceles trapezoid is provided at a side close to the center of the rotor iron core 2. Through the above arrangement, each of the permanent magnets 1 is of a centrosymmetric structure, and a center line of each of the permanent magnets 1 is a middle line of the isosceles trapezoid. Through the above arrangement, it is convenient to process and assemble the permanent magnets 1.

Figure 4:
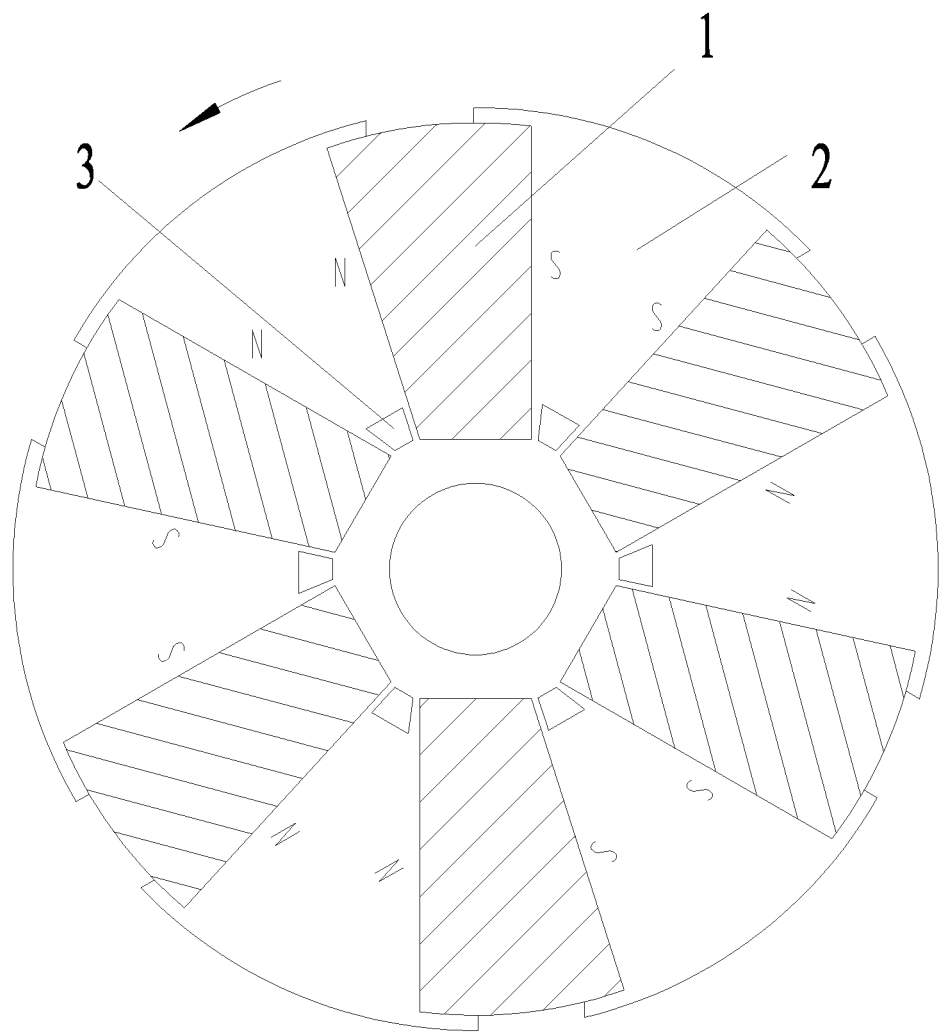
FIG. 4 is a second structural schematic diagram of a tangential type permanent magnet rotor provided by the present invention.

As shown in FIG. 4, in the embodiment, a cross section, perpendicular to an axial line of the tangential type permanent magnet rotor, of each of the permanent magnets 1 is of a non-isosceles trapezoid, an upper bottom of the non-isosceles trapezoid is provided at a side close to the center of the rotor iron core 2, and a waist of the non-isosceles trapezoid comprises a first waist provided at a front side of a rotation direction of the tangential type permanent magnet rotor and a second waist provided at a rear side of the rotation direction of the tangential type permanent magnet rotor; a length of the first waist is greater than that of the second waist. Through the above arrangement, an area of a surface, positioned at the front side of the rotation direction of the tangential type permanent magnet rotor, of each of the permanent magnets 1 is greater than that of a surface, positioned at the rear side of the rotation direction of the tangential type permanent magnet rotor, of each of the permanent magnets 1, so that the permanent magnets 1 generate a larger stator magnetic flux.

The rotor iron core 2 is provided with an outside magnetism isolating bridge provided at one side, close to the outer edge of the rotor iron core 2, of each of the permanent magnets 1. The rotor iron core 2 comprises a plurality of outside magnetism isolating bridges. Each of the outside magnetism isolating bridges comprises a first outside magnetism isolating bridge provided at the front side of the rotation direction of the tangential type permanent magnet rotor, and a second outside magnetism isolating bridge provided at the rear side of the rotation direction of the tangential type permanent magnet rotor. That is, a sum of the first outside magnetism isolating bridge and the second outside magnetism isolating bridge is smaller than the width H2 of the corresponding each of the permanent magnets 1. Through the above arrangement, it is ensured that the permanent magnets 1 are fixed inside the rotor iron core 2. And meanwhile, the flux leakage of the permanent magnets 1 in an outside of the tangential type permanent magnet rotor is reduced. When the electric motor rotates, stresses borne by the first outside magnetism isolating bridges and the second outside magnetism isolating bridges in the outside of the tangential type permanent magnet rotor are not the same. The stress of each of the first outside magnetism isolating bridges at the front side of the rotation direction of the tangential type permanent magnet rotor is greater than that of each of the second outside magnetism isolating bridges at the rear side all the time. Therefore, a thickness B1 of each of the first outside magnetism isolating bridges is greater than a thickness B2 of each of the second outside magnetism isolating bridges, and a length D1 of each of the first outside magnetism isolating bridges is smaller than a length D2 of each of the second outside magnetism isolating bridges. Through the above arrangement, a stress concentration is reduced, and a mechanical strength of the tangential type permanent magnet rotor is enhanced.

Figure 5:
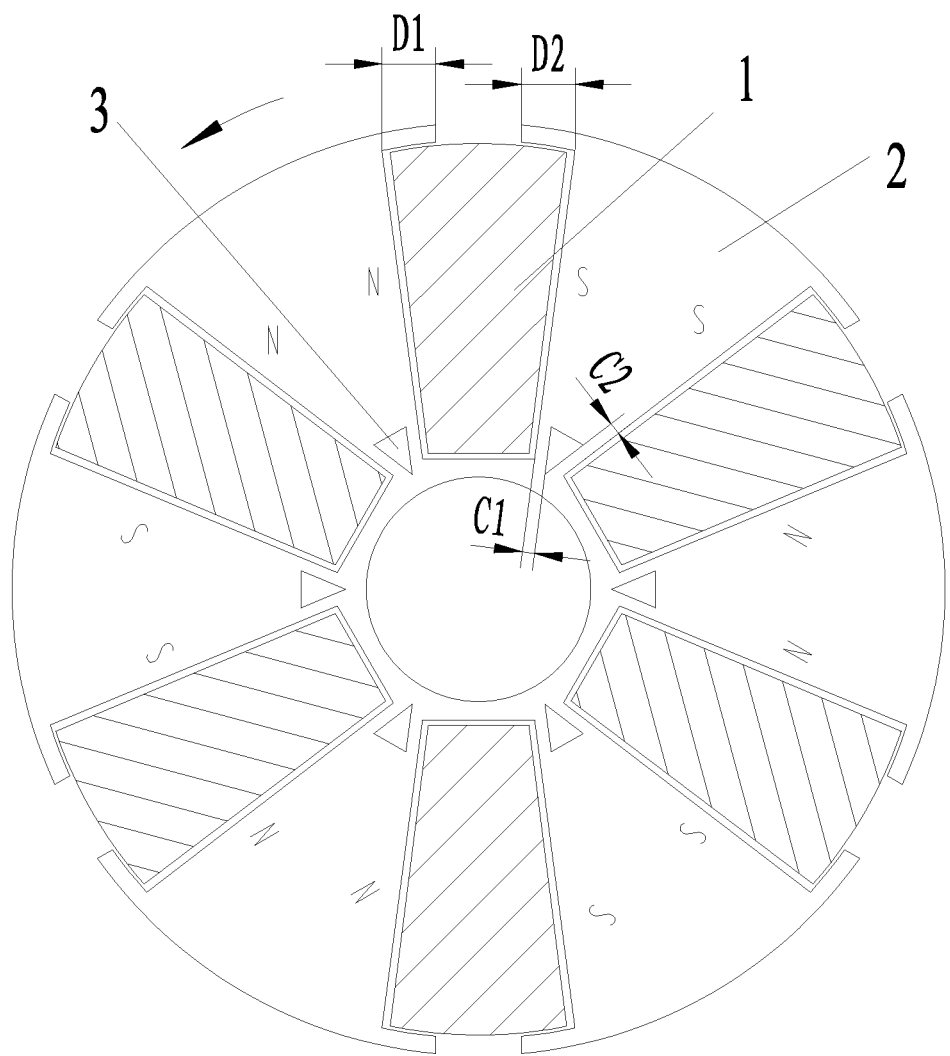
FIG. 5 is a third structural schematic diagram of a tangential type permanent magnet rotor provided by the present invention.
Figure 6:
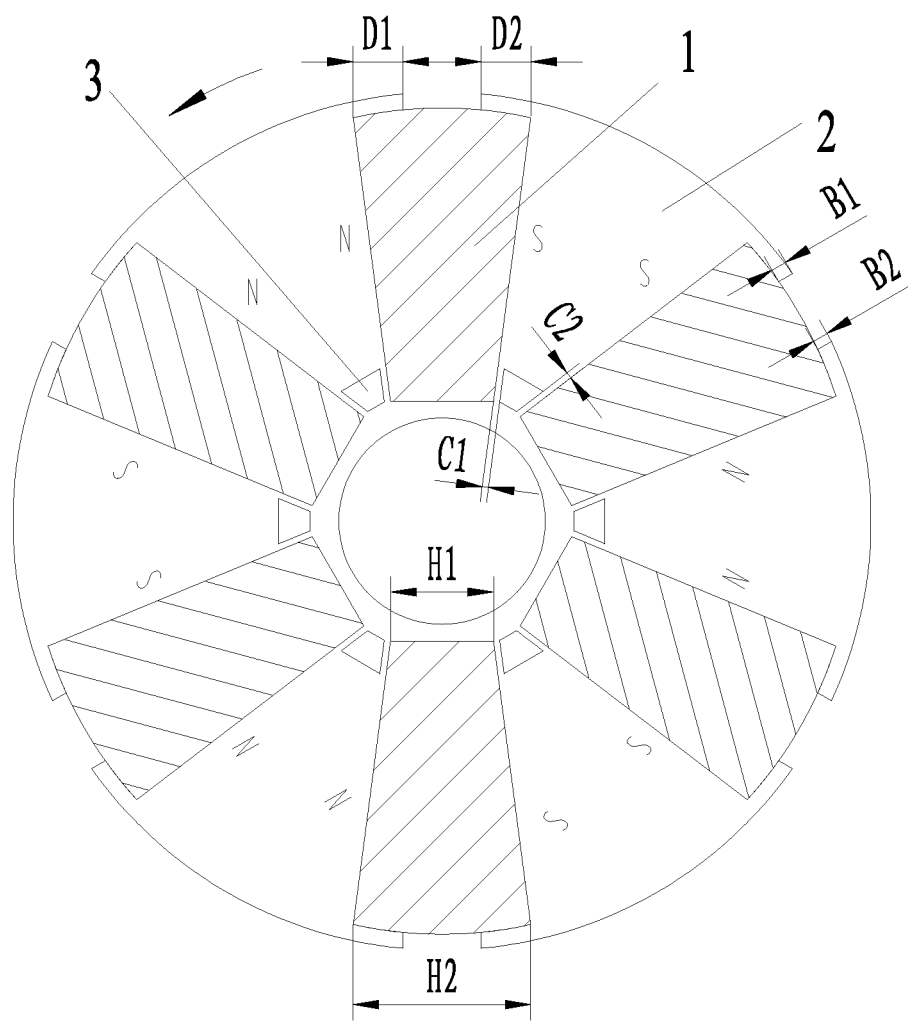
FIG. 6 is a fourth structural schematic diagram of a tangential type permanent magnet rotor provided by the present invention.

Further, as shown in FIG. 5 and FIG. 6, the rotor iron core 2 is further provided with an inside magnetism isolating structure 3 provided between certain sides, close to the center of the rotor iron core 2, of the adjacent two of the permanent magnets 1. A cross section, perpendicular to an axial line of the tangential type permanent magnet rotor, of the inside magnetism isolating structure 3 is of a triangular or trapezoidal structure; a small end of the inside magnetism isolating structure 3 is towards the center of the rotor iron core 2. Two magnetism isolating bridges are provided between the adjacent two permanent magnets 1. To simplify the structure here, the two magnetism isolating bridges are respectively provided in the inside magnetism isolating structure 3. Because each of the permanent magnets 1 is of a trapezoidal structure, the two magnetism isolating bridges respectively are two edges of the inside magnetism isolating structure 3; moreover, an included angle is respectively provided between the two magnetism isolating bridges, such that a cross section, perpendicular to the axial line of the tangential type permanent magnet rotor, of each of the inside magnetism isolating structures 3 is of the triangular or trapezoidal structure; and thus, a silicon steel sheet structure between the two permanent magnets has better structural strength and is not tilted easily, thereby guaranteeing the dimensional stability of permanent magnet grooves for accommodating the permanent magnets 1 in the rotor iron core 2.

Further, a first inside magnetism isolating bridge is formed between the inside magnetism isolating structure 3 and each of the permanent magnets 1 provided at a front side of the rotation direction of the tangential type permanent magnet rotor; a second inside magnetism isolating bridge is formed between the inside magnetism isolating structure 3 and each of the permanent magnets 1 provided at a rear side of the rotation direction of the tangential type permanent magnet rotor; a thickness C1 of the first inside magnetism isolating bridge is greater than a thickness C2 of the second inside magnetism isolating bridge. Through the above arrangement, a stress concentration of the first inside magnetism isolating bridge is avoided.

Figure 7:
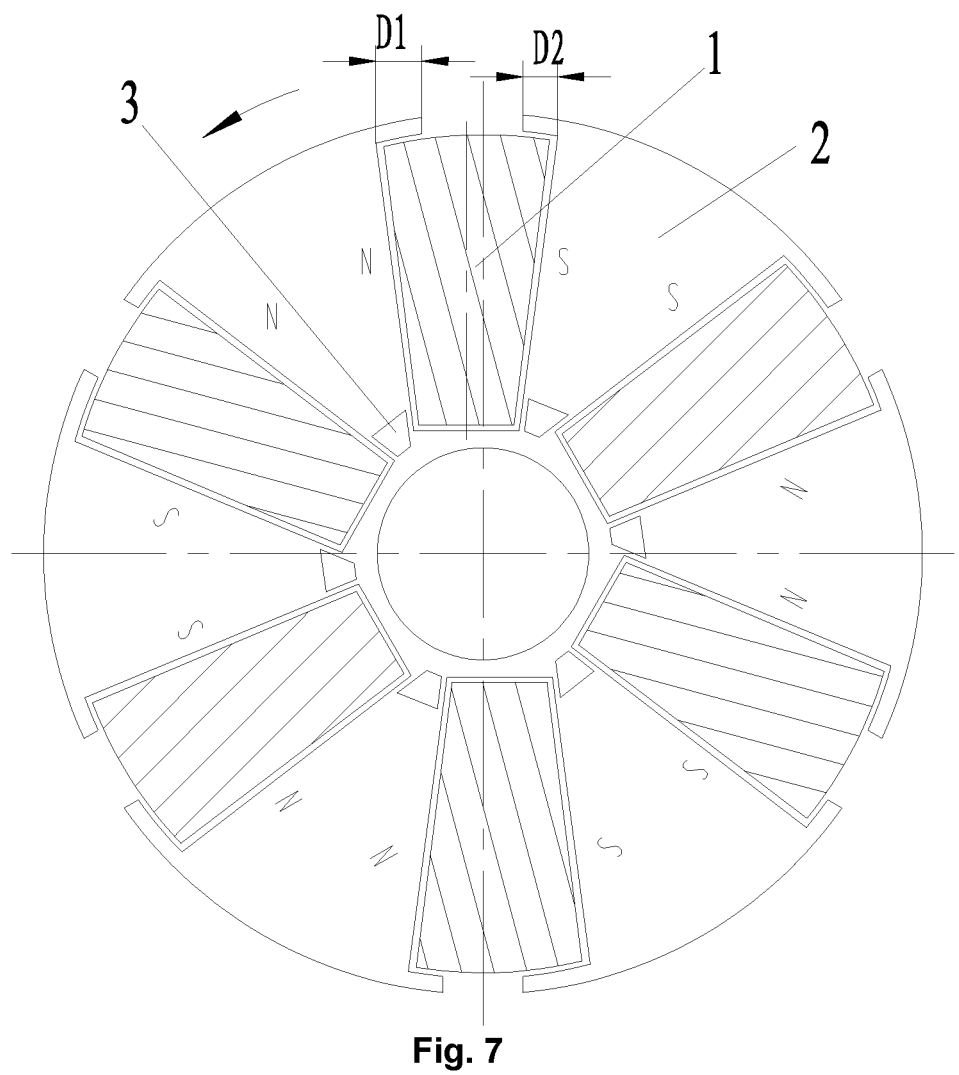
FIG. 7 is a fifth structural schematic diagram of a tangential type permanent magnet rotor provided by the present invention.

As shown in FIG. 7, a middle line of each of the permanent magnets 1 is provided at a front side of a rotation direction of the tangential type permanent magnet rotor provided on a diameter line of the corresponding permanent magnet 1. The diameter line is a straight line where a diameter of the rotor iron core perpendicular to a side, close to the center of the rotor iron core 2, of each of the permanent magnets 1 is located.

Through the above arrangement, each of the permanent magnets 1 is tilted to the front side of the rotation direction of the rotor, such that the electric motor can generate a larger torque under a same current, a torque pulsation of the electric motor is reduced and an electromagnetic noise of the electric motor is reduced.

The embodiment of the present invention further provides an electric motor, comprising a tangential type permanent magnet rotor; the tangential type permanent magnet rotor is the tangential type permanent magnet rotor described above. As the tangential type permanent magnet rotor has the above technical effects, the electric motor having the tangential type permanent magnet rotor also should have the same technical effects, which will not be described in detail here.

The above describes the tangential type permanent magnet rotor provided by the present disclosure in detail. In the specification, the principle and implementation manners of the present disclosure are described using a specific embodiment, and the description on the above embodiment only is intended to understand the method of the present disclosure and the core concept thereof. It should be noted that, those of ordinary skill in the art further may make various improvements and modifications on the present disclosure without departing from the principle of the present disclosure. The improvements and the modifications should all fall in the protection scope of the appended claims of the present invention.

What is claimed is:

1. A tangential type permanent magnet rotor, comprising a rotor iron core (2) and permanent magnets (1) provided on the rotor iron core (2), wherein
    a width of one side, close to an outer edge of the rotor iron core (2), of each of the permanent magnets (1) is H2; and a width of one side, close to a center of the rotor iron core (2), of each of the permanent magnets (1) is H1, wherein H2>H1;
    a maximum included angle of a magnetic conductive passage between adjacent two permanent magnets (1) is A2, and a minimum included angle of each of the permanent magnets (1) is A1, A2≥A1;
    the A1 is an included angle of connecting lines that are respectively between two ends of a surface at one side, close to the outer edge of the rotor iron core (2), of each of the permanent magnets (1) and the center of the rotor iron core (2); the A2 is an included angle of connecting lines that are respectively between two ends of a surface at one side, close to the outer edge of the rotor iron core (2), of the magnetic conductive passage between the adjacent two permanent magnets (1) and the center of the rotor iron core (2); in the adjacent two permanent magnets, an intersection between an extension line of one side of one permanent magnet in the adjacent two permanent magnets and an extension line of one side of the other permanent magnet in the adjacent two permanent magnets does not coincide with a rotation center of the rotor; wherein A2≤1.6A1;
    wherein a middle line of each of the permanent magnets (1) is provided at a front side of a rotation direction of the tangential type permanent magnet rotor, the tangential type permanent magnet rotor is provided on a diameter line of the corresponding each of permanent magnets (1);
    the diameter line is a straight line where a diameter of the rotor iron core perpendicular to a side, close to the center of the rotor iron core, of each of the permanent magnets (1) is located.

2. The tangential type permanent magnet rotor as claimed in claim 1, wherein 2.2≥H2/H1≥1.2.

3. An electrical motor, comprising a tangential type permanent magnet rotor, wherein the tangential type permanent magnet rotor is the tangential type permanent magnet rotor according to claim 2.

4. The tangential type permanent magnet rotor as claimed in claim 1, wherein a cross section, perpendicular to an axial line of the tangential type permanent magnet rotor, of each of the permanent magnets (1) is of an isosceles trapezoid; an upper bottom of the isosceles trapezoid is provided at a side close to the center of the rotor iron core (2).

5. An electrical motor, comprising a tangential type permanent magnet rotor, wherein the tangential type permanent magnet rotor is the tangential type permanent magnet rotor according to claim 4.

6. The tangential type permanent magnet rotor as claimed in claim 1, wherein a cross section, perpendicular to an axial line of the tangential type permanent magnet rotor, of each of the permanent magnets (1) is of a non-isosceles trapezoid, an upper bottom of the non-isosceles trapezoid is provided at a side close to the center of the rotor iron core (2), and a waist of the non-isosceles trapezoid comprises a first waist provided at a front side of a rotation direction of the tangential type permanent magnet rotor and a second waist provided at a rear side of the rotation direction of the tangential type permanent magnet rotor; a length of the first waist is greater than that of the second waist.

7. An electrical motor, comprising a tangential type permanent magnet rotor, wherein the tangential type permanent magnet rotor is the tangential type permanent magnet rotor according to claim 6.

8. The tangential type permanent magnet rotor as claimed in claim 1, wherein the rotor iron core (2) is provided with an outside magnetism isolating bridge provided at one side, close to the outer edge of the rotor iron core (2), of each of the permanent magnets (1);
    the outside magnetism isolating bridge comprises a first outside magnetism isolating bridge provided at a front side of a rotation direction of the tangential type permanent magnet rotor, and a second outside magnetism isolating bridge provided at a rear side of the rotation direction of the tangential type permanent magnet rotor;
    a thickness B1 of the first outside magnetism isolating bridge is greater than a thickness B2 of the second outside magnetism isolating bridge; a length D1 of the first outside magnetism isolating bridge is smaller than a length D2 of the second outside magnetism isolating bridge.

9. The tangential type permanent magnet rotor as claimed in claim 1, wherein the rotor iron core (2) is further provided with an inside magnetism isolating structure provided between sides, close to the center of the rotor iron core, of the adjacent two of the permanent magnets (1);
- a cross section, perpendicular to an axial line of the tangential type permanent magnet rotor, of the inside magnetism isolating structure is of a triangular or trapezoidal structure; a small end of the inside magnetism isolating structure is towards the center of the rotor iron core (2).

10. The tangential type permanent magnet rotor as claimed in claim 9, wherein a first inside magnetism isolating bridge is formed between the inside magnetism isolating structure and each of the permanent magnets (1) provided at a front side of a rotation direction of the tangential type permanent magnet rotor; a second inside magnetism isolating bridge is formed between the inside magnetism isolating structure and each of the permanent magnets (1) provided at a rear side of the rotation direction of the tangential type permanent magnet rotor;
- a thickness C1 of the first inside magnetism isolating bridge is greater than a thickness C2 of the second inside magnetism isolating bridge.

11. An electrical motor, comprising a tangential type permanent magnet rotor, wherein the tangential type permanent magnet rotor is the tangential type permanent magnet rotor according to claim 1.

* * * * *